United States Patent [19]
Lefevre et al.

[11] Patent Number: 5,408,550
[45] Date of Patent: Apr. 18, 1995

[54] REMOTE FIBER OPTIC ELECTRICAL SWITCH USING LIGHT PULSE SIGNALS

[75] Inventors: Donald K. Lefevre; Daniel J. Mulally, both of Rapid City, S. Dak.

[73] Assignee: Wireless Control System, Inc., Rapid City, S. Dak.

[21] Appl. No.: 207,618

[22] Filed: Mar. 9, 1994

[51] Int. Cl.⁶ ................................................. G02B 6/26
[52] U.S. Cl. ......................................... 385/18; 385/19
[58] Field of Search .............. 359/230, 234, 235, 336, 359/889; 385/15–23, 25, 33

[56] References Cited

U.S. PATENT DOCUMENTS

| | | | |
|---|---|---|---|
| 4,569,569 | 2/1986 | Stewart | 385/33 |
| 4,591,231 | 5/1986 | Kaiser et al. | 385/19 |
| 4,596,442 | 6/1986 | Anderson et al. | 385/18 |
| 5,046,806 | 9/1991 | Kidder et al. | 385/16 |
| 5,163,112 | 11/1992 | Lefevre et al. | 385/19 |

FOREIGN PATENT DOCUMENTS

2-131210  5/1990  Japan ..................................... 385/18

*Primary Examiner*—Rodney B. Bovernick
*Assistant Examiner*—John Ngo
*Attorney, Agent, or Firm*—Frank D. Gilliam; John R. Duncan

[57] ABSTRACT

A remote switch system for controlling electrical devices, such as electrical lights, from a remote switch location using a single optical fiber or thin bundle of optical fibers to communicate the controlling signal from the remote switch to the device. The fiber optic system includes both an emitter and a detector at the first end of a fiber optic. The emitter sends a light signal through the fiber and the detector detects a reflected signal coming back through the fiber. Conventional switching circuits or relays turn the electrical device, e.g. a light, to a different state, such as "on" or "off", different brightness or the like in response to a pulse of light or the presence or absence of a returning signal. The remote switch is located at the second end of the fiber and includes a retroreflector positioned to reflect light exiting the second end back into the fiber and a obstructor panel having at least one pulse generating area with different light transmission characteristics movable past the end of the fiber. The pulse generating area may be an aperture in an opaque obstructor, an opaque area in a transparent obstructor panel. Plural pulse generating areas may be used in a variety of coding patterns. A plurality of switches may be provided at different locations to control a device.

40 Claims, 2 Drawing Sheets

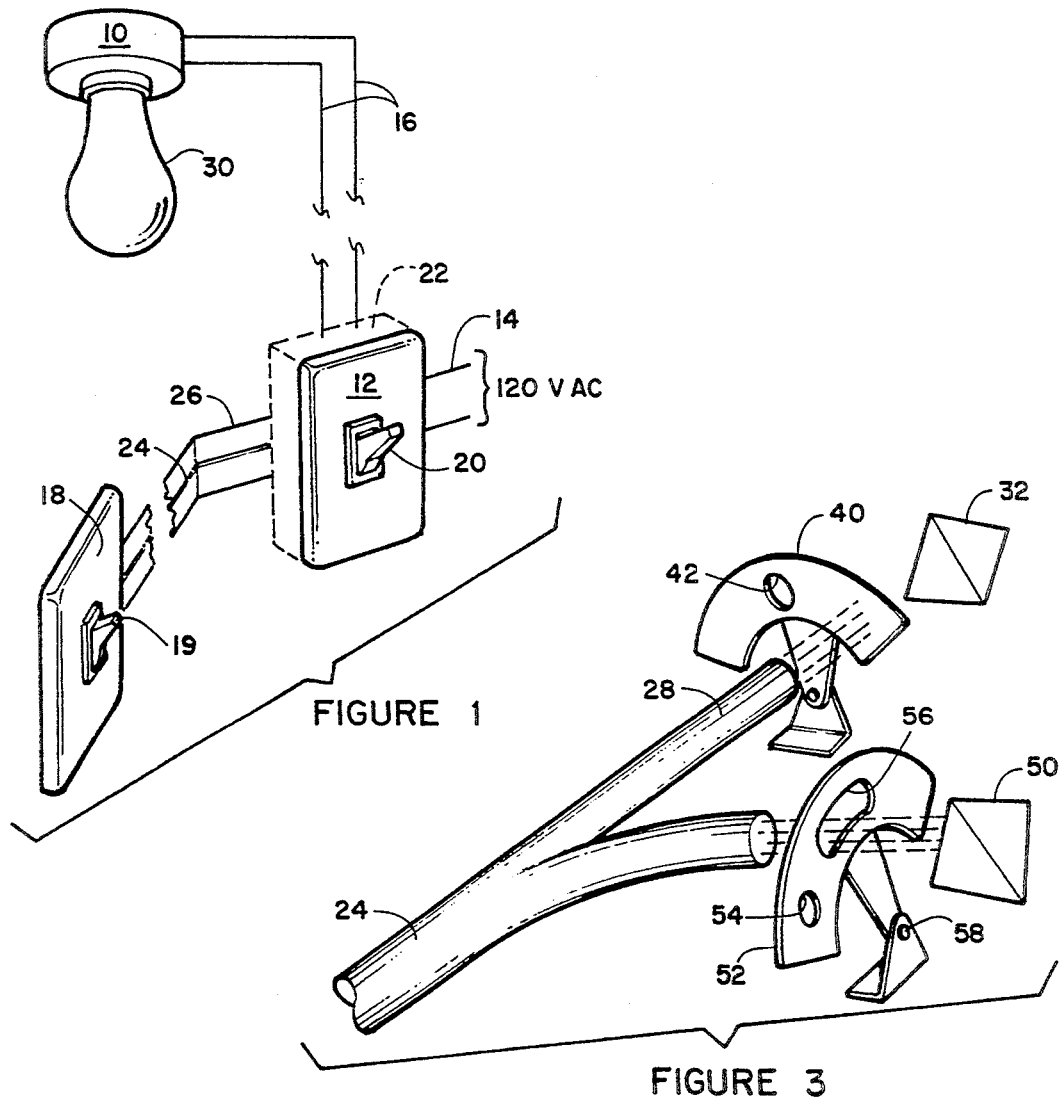
FIGURE 1
FIGURE 3
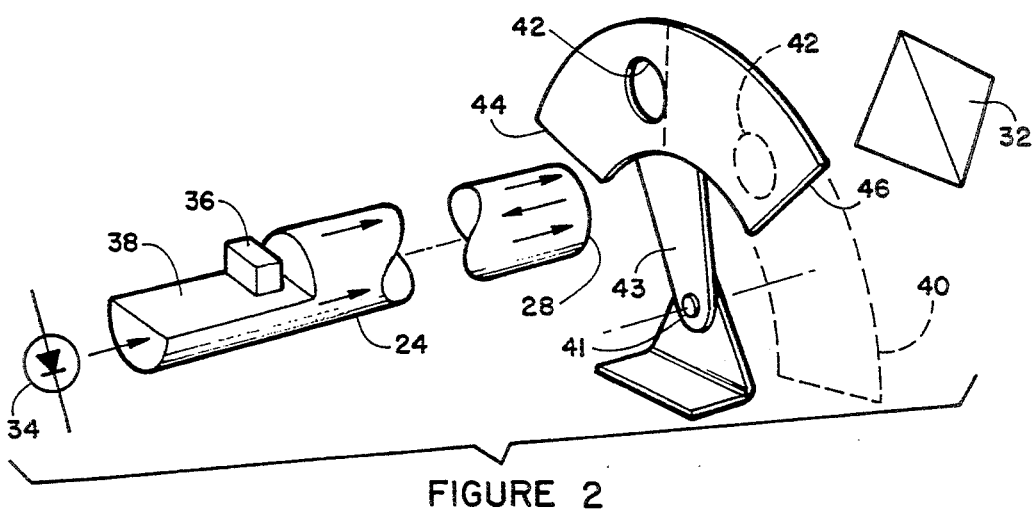
FIGURE 2

REMOTE FIBER OPTIC ELECTRICAL SWITCH USING LIGHT PULSE SIGNALS

BACKGROUND OF THE INVENTION

This invention relates in general to electrical switches and, more specifically, to a remote switching system using a single fiber or a thin bundle of fibers to carry the switching signal.

Conventionally, switches having at least two insulated metal wires are used to connect switches to electrical devices, such as lights, motors, fans, heaters or the like, to allow the device to be turned on and off.

In new construction, the wires are extended through walls, requiring cutting holes through studs, and threading the wires therethrough. There is always a danger that someone, during construction or later, may insert screws or nails into the wall, drill holes, etc. and contact the wires, resulting in a shock and fire hazard.

In remodeling of rooms or adding new electrical devices, adding switches with insulated metal wires between the new switches and devices is expensive and difficult, requiring fishing wires through existing, covered, walls. In some cases, switches are desired on thin partition walls or solid masonry walls where the wiring cannot be hidden. The use of surface mounted wires or loose extension cords is both visually undesirable and a safety hazard.

Attempts have been made to use thin wires taped to the wall for remote switches. However, because of the required insulation and required wire diameter, the surface mounted wires are very apparent and unattractive. Also, the wires are subject to damage, such as during moving of furniture, resulting in both an electrical shock and fire hazard.

Recently, a number of small hand-held remote controls using a radio frequency or infrared signal sent to a receiver at the device to be controlled have been developed. These are very effective in a number of applications, such as the control of audio or video entertainment equipment. They are, however, less successful in applications such as the control of room lights and similar permanent devices. Generally, these remote controls require a receiver mounted at the device, such as at an electrical outlet between a lamp plug and the outlet. These senders and receivers tend to be expensive and prevent the normal lamp switch from being used. Also, the senders are easily misplaced. These remote control devices are not usable with general room lighting controlled by a wall switch or in similar applications.

In an effort to overcome these problems with remote electrical switches using metal, current carrying, wiring, the use of fiber optics has been proposed. Speers, in U.S. Pat. No. 4,023,887 discloses complex switching systems using cables each made up of a plurality of parallel optical fibers to carry various signals. While these cables may be laminated to walls, it is apparent that the size of the cables will result in obvious, obtrusive strips across the wall, since at least two optical fibers are needed between each switch and controlled device. Similarly, Matsunaga et al, in U.S. Pat. No. 4,705,348 discloses an optical switch using two optical fibers between a complex switch and the device being controlled. The reflector used by Matsunaga et al would require very precise alignment of the fiber ends and the reflector and careful orientation and polishing of the fiber ends to be certain that sufficient light entering from one fiber is reflected into the other.

Others, such as Narondy in U.S. Pat. No. 3,886,544 and Ho et al in U.S. Pat. No. 4,797,549 simply interpose a blocking or reflecting member into a break between two coaxial optical fibers to selectively block or permit light passage. These techniques require highly polished fiber ends, cut precisely 90° to the fiber axis and careful alignment of the fiber ends to allow sufficient transfer of light from one fiber to the other.

In our prior U.S. Pat. No. 5,163,112, assigned to the assignor of this application, we described an improved remote switch system using a single optical fiber, or a very thin optical fiber bundle running between an electrical device to be controlled and a remote location. A light emitter and a light detector were located at the device end of the fiber and a movable retroreflector was located at the remote location. A pulse of light could be sent to the device by rotating the retroreflector from a position out of alignment with the fiber end, through an aligned position that would reflect light back into the fiber to a second out of alignment position. While highly effective, this system required means for rotating the retroreflector and could not conveniently provide a series of light pulses of different lengths.

Thus, there is a continuing need for improved systems for switching electrical devices between different states, such as on and off, which eliminate the problems with metal electrical wiring between switch and device, have greater reliability, compactness and simplicity than prior non-wired systems and permit easy and unobtrusive addition of remote switches to existing construction.

SUMMARY OF THE INVENTION

It is, therefore, an object of this invention to provide a remote electrical switch system overcoming the above noted problems. An additional object is to provide a system in which the state of an electrical device may be changed from any of a number of remote sites. Another object is to provide a remote switching and control system having no electrical connection to the remote switch. A further object is to provide a remote switching system adapted to easy installation with all connections unobtrusively surface mounted on intervening walls. Yet another object is to provide a remote switch of improved simplicity and compact size. A further object is to provide a fiber optic signal carrying system between a remote location and a device providing varying pulsed signals for different purposes through a single fiber or fiber bundle.

The above-noted objects, and others, are accomplished in accordance with this invention, which basically comprises an optical fiber means made up of single optical fiber or a thin bundle of fibers extending from the location of an electrical device which is to be switched between "on" and "off" states (or other variable states, such as changes in intensity or speed) to one or more remote control locations, an emitter at the device location for directing light into the fiber, a detector at the device location for receiving light from the fiber, means to reflect light back into the fiber at the remote switch location, light obstructing means between the reflecting means and the adjacent fiber end, means to move said light obstructing means relative to the fiber end so that at least one change in light intensity is transmitted from said reflecting means through said aperture back through the fiber and means at the device to change the state of the device in response to the receipt of a pulse or pulses of different light intensity at the detector.

Generally, the light obstructing means has one light transmission characteristic, such as being transparent or opaque, and the pulse generating areas have the opposite. Also, the pulse generating areas may have varying density to produce pulses of varying intensity. In one preferred embodiment, the light obstructing means is opaque and has one or more light transmitting openings forming pulse generating areas. When the obstructor is moved through the light path between the fiber end and the reflecting means, light pulses corresponding to the pattern of openings are transmitted back through the fiber optic.

Any suitable pattern of openings may be used. For example a single opening will produce a single pulse to change the state of a device being controlled. If desired, a single movable obstruction could be moved at least partially into or out of the light path causing a change in transmitted light intensity. Coded light signals may be transmitted, by pulse width modulation where the openings have different sizes so that long and short pulses are produced in a selected pattern. Or, openings of the same size but spaced different distances apart may be used to produce pulse code modulation in the timing of the successive pulses. Where a number of pulse generating stations are provided using a single length of optical fiber, each station having a unique pulse code could control different device parameters.

Conversely, light could be normally transmitted through the fiber and a transparent obstructor with opaque pulse generating areas moved through the light path to cause the change in state. In the same manner as described with the light pulses above, "dark" pulses could be created by the opaque areas on a transparent member moved past the fiber optic end. The areas could have different sizes or different spacings to produce pulse width or pulse code modulation of the sort described above.

In a further embodiment, the member moving between the fiber optic end and the reflecting means could have areas of different optical density, with different areas producing light of different intensity at the device being controlled. For example, a series of openings could be evenly spaced, but some could be open, some covered and opaque and some covered with a conventional neutral density filter that absorbs about half of the light striking it. The resulting pulse train would have a series of full intensity, no light and half-intensity pulses. Many combinations of this array could be used to operate a variety of devices.

While the preferred embodiments above all utilize discrete pulses of light or "dark", if desired, the obstructor could simply obstruct or not obstruct the light path so that the light is either passing or not passing back through the fiber. This stepped arrangement would be suitable for many simple system configurations.

Typically, the electrical device being controlled by one of the light intensity varying systems described above may be an electrical light such as ceiling lights controlled by a wall switch, wall mounted electrical heaters, ceiling fans controlled by wall switches or the like. These devices could be turned on and off, or further stepped changes could be caused, such as varying light brightness (similar to a conventional dimmer), fan speed could be increased step-wise, etc. The remote fiber optic switch of this invention may be directly connected to the device being controlled, as would be usual in new construction or may be connected to the conventional wall switch, as would be usual in remodeling or modification of existing structures.

The switch system uses a fixed retroreflector aligned with the fiber end with a movable light obstructing means, such as a movable panel which may have an aperture, movable past the optical path between fiber end and retroreflector. The retroreflector alignment need not be precise. As the panel or aperture moves across the optical path, a pulse of light, a pulse of dark or a change in intensity is reflected back into the fiber to the device location where conventional control means changes the state of the device, such as from "off" to "on". A number of different switches may be used, each capable of reversing or otherwise changing the device state. Where two or more electrical devices at the same general location, such as a ceiling fan and a ceiling light, are to be controlled from a remote location, two switches can share a single optical fiber. Typically, the first switch would have a single aperture, sending a single pulse. The second switch would have two or more apertures (which could be of different size to provide pulses of different lengths). In this embodiment, the detector receives the pulses and converts them to electrical pulses of corresponding length.

Any of the other systems for producing coded sequences of changed light intensity described above could be used. Conventional decoding means would then activate the device corresponding to the pulse pattern. Such decoding means are used, for example, in modern player pianos where light passes through apertures of varying length in a moving tape to photo diodes that activate piano keys in response to length and spacing of light pulses received. While the movable light obstruction arrangement is preferred, other devices for selectively obstructing or passing light could be used, such as Kerr or Bragg cells, variable density liquid crystal panels or pairs of relatively rotatable polarizers for varying light transmission.

If desired, as discussed above, the arrangement could be reversed; that is, light would be normally passing through the fiber and could be obstructed temporarily to send a "dark pulse" to control a device. Also, a series of light or dark pulses could be used to step a device through a series of steps, such as where the device includes a light dimmer, with each pulse initially gradually, step-wise, dimming the device to off, then stepping back to full on. Also, with a single obstruction, the time duration that the obstruction blocks reflection can control a variable state of the device, such as the brightness of a light, the speed of a motor, etc. Thus, a "pulse" would include transmitting light for a short period (a "light" pulse) or interrupting light transmission for a short period (a "dark" pulse), a change in light intensity over a short period (a "step" pulse) or any other suitable change in light characteristics over a short period. As described above, a series of such pulses may be used. If desired the pulse type, spacing, intensity, etc. may varied or coded to cause a particular action at the receiving device. The time period over which light transmission is obstructed or unobstructed could be used to control a device characteristic, such as the brightness of a light. For example, obstruction of light could cause a light to turn full on and a conventional dimmer circuit could gradually dim the light until the obstruction is removed. The reverse, of course, could be used with a light turned on for a selected period.

In some cases, simply switching between states, e.g., from light to dark, between light intensity steps is a pulse of the sort that can control a device. No particular pulse length or time period between changes is necessary for the operation of this invention.

While a single, very thin optical fiber is preferred, a very thin bundle of substantially parallel very thin fibers could be used if desired. For the purposes of this invention, "optical fiber means" includes both a single fiber optic strand, or a small bundle of such strands. In either case, the emitter light signal passing in one direction and the signal to the detector passing in the other will pass through the single fiber or nearly all of the fibers in the bundle. This dual use will permit the preferred single fiber or bundle to be extremely thin, much thinner than would be possible with a bundle in which different fibers carry the signals passing in opposite directions. For best results where the fiber or bundle is to be surface mounted on a wall with tape, the fiber or bundle should have a diameter of from about 0.003 to 0.03 inch, although a fiber bundle having a diameter of up to about 0.1 inch may be used if greater visibility is acceptable.

The optical fiber can be easily installed by taping the fiber to the wall or other surface between the remote location and the device being controlled, then painting over the tape. Preferably a self-adhesive tape with the fiber coaxial with the tape is preferred. The painted tape with the very thin optical fiber will be very unobtrusive, often nearly invisible. In the case of new construction, the optical fiber means can be placed under the wall surface or within a wall. Or, the fiber could be concealed in corners, in cracks, behind a baseboard, etc.

BRIEF DESCRIPTION OF THE DRAWING

Details of the invention, and of certain preferred embodiments thereof, will be further understood upon reference to the drawing, wherein:

FIG. 1 is a schematic perspective view of the system of this invention connected to an existing electrical switch arrangement;

FIG. 2 is a schematic detail perspective view showing the optical fiber end connections for reflecting a light pulse back into the fiber;

FIG. 3 is a schematic detail perspective view of a second embodiment producing a reflected pulse pattern;

DETAILED DESCRIPTION OF PREFERRED EMBODIMENTS

Figure 4A:
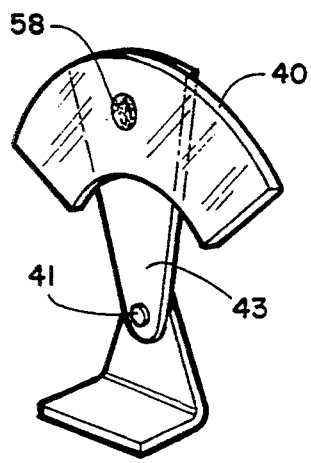
FIG. 4a is a schematic elevation view of a light obstructor capable of generating "dark" pulses.

Referring now to FIG. 1, there is seen a schematic representation of a wall switch added on to an existing system. A light 10, typically a built-in ceiling light, was originally wired to be operated by a conventional switch 12, using 120 volt line 14 and conventional insulated copper wires 16 running within the wall. It is now desired to add a second wall switch 18 at a different location. Optionally, switch 12 may still be used, with switches 12 and 18 each operable in the manner of conventional three-way switches, or switch 18 could entirely replace switch 12 which might, for example, have the front plate and switch actuator 20 removed and the switch location covered, such as by wood paneling.

To install a conventional switch at switch 18 would be difficult, expensive and beyond the ability of most do-it-yourself homeowners. Conventional wiring would require the installation of an insulated copper conductor cable within the wall or within unsightly surface mounted conduits between switches 12 and 18. An electrical cable within the wall has some danger, since if during other remodeling nails are hammered into the wall or holes are drilled into the wall a shock or fire hazard could result. Attempting to run a metal wire cable between the switches along the outer surface of the wall would be unattractive and dangerous. Shock hazards are also present where conventional electrical switches are used in wet or high humidity environments, such as kitchens, bathrooms or outdoor locations. Most conventional electrical switches cannot safely be used in explosive environments, such as industrial locations or hospital patient bed headboards where oxygen is present.

Instead, in accordance with this invention, a light emitter and detector system, as described below, is placed in the junction box 22 behind switch 12, with a very thin optical fiber 24 extending along the wall surface to switch 18, covered by a thin self-adhesive, paintable tape 26. Switch 12 is ordinarily powered even when the light is on. Switch 18 is actuated by a conventional lever-type actuator 19 of the sort that has a spring or "snap" action, causing the actuator to move to the fully moved position when moved over center. As is detailed below, it is preferred that the switch action take place quickly. Alternatively, a slide switch or any other suitable switch may be used.

For surface mounting, optical fiber 24 is very thin, preferably having a diameter of from about 0.003 to 0.10 inch, so that the fiber 24 and tape 26 will very unobtrusive, in fact nearly invisible, when painted over to blend with the wall paint. Any suitable optical fiber may be used, either plastic or glass core fibers. While a single fiber is preferred for maximum performance at very small diameters, a thin fiber bundle may be used, if desired. As detailed below, maximum fiber efficiency is achieved since all of the light signals passing in both directions pass through the same fiber or small bundle. Typical fibers that may be used are available from Mitsubishi, Poly-Optic Products, Amoco, Gould, Hewlett-Puckered and others. Any suitable paper or plastic tape may be used that is easily and permanently affixed to the wall, has a smooth texture and is paintable with conventional paints.

The system shown in FIG. 1 is also inexpensive when used in remodeling existing construction or in new construction, since it can easily be installed without having to fish wires through walls and no junction box and hard wiring is required. In new construction, the light generating means and the means for actuating the device in response to a returned light signal could be located at device 10, with the optical fiber 24 running directly between switch 18 and device 10. Often, for example, a ceiling light is located in an unfloored attic, providing easy access to install the light and associated control components, with the optical fiber running along the wall surface to a switch or switches, eliminating the need to enter the wall with wires. This is a very safe system, since there are no shock or explosion hazards at the switch and no electrical hazards if optical fiber 24 should be damaged, cut or contacted with metal objects, such as nails, or becomes wet. Additional optical switches 18 could be easily installed, either connected in series as shown in FIG. 1 or with separate fibers going to the device being controlled. If desired, the light from optical fibers from other switches can be combined with an optical coupler. Also, the ends of the fibers from additional switches could all be arranged to point at the same emitter and detector or emitter/detector.

The fiber optic signal system is schematically shown in FIG. 2. The optical fiber 24, which is a single fiber or very small bundle, extends from the power source, e.g. lamp or existing hard-wired switch, to the new switch containing a retroreflector 32, preferably small flat panel bearing a plurality of very small, closely spaced spherical lens based or cube-corner based retroreflectors, making up retroreflector 32. While a conventional flat mirror could be used, the retroreflector is preferred because of the greater reflecting efficiency and full effectiveness even when not absolutely precisely aligned with the end 28 of fiber 24. Light is directed into fiber 24 by a conventional emitter 34, typically a light emitting diode (or the other light sources mentioned above), passes through fiber 24 to retroreflector 32 and (if no obstruction is present between reflector 32 and fiber end 28) is returned through the same fiber to a conventional detector 36.

The retroreflector 32 material is available from the 3M Company, as cube corner material or spherical lens material under the Scotch-Lite brand on sheet or fabric material, with or without a covering matrix.

Figure 5A:
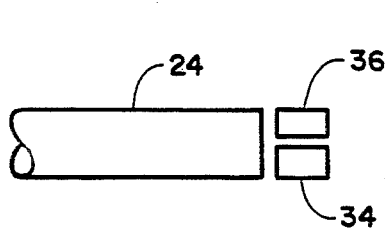
FIG. 5a is a schematic detail view showing another way of arranging an emitter and a detector relative to a fiber end.
Figure 5B:
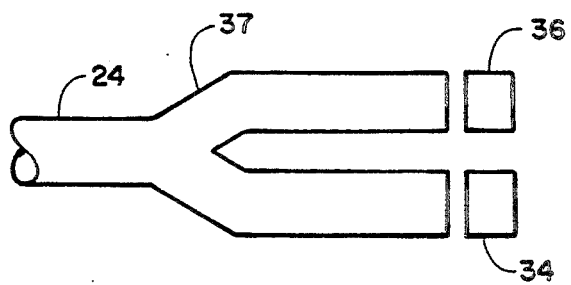
FIG. 5b is a schematic detail view showing still another way of arranging an emitter and a detector relative to a fiber end.

While the stepped end 38 of fiber 24 is effective, if desired, as shown in a detail view in FIG. 5a, a standard fiber optic coupler 37 may be used to divide fiber 24 at the emitter/detector end to provide full fiber width for each of the detector 36 and emitter 34. Emitter 34 and detector 36 may be arranged side by side in contact with each other or stacked one over the other, with the single fiber or small fiber bundle aligned with the intersection between the emitter and detector, so that emitter light enters approximately one half of the single fiber or fiber bundle and the detector receives light through the other approximate half of the fiber or bundle, as shown in the detail view of FIG. 5b.

The reflection of light from retroreflector 32 to the adjacent fiber end 28 is controlled by movement of an obstructor 40, typically a rotatable or slidable panel or disk. In a preferred configuration, obstructor 40 is a circular segment as shown, pivotable about pivot 41 on arm 43. Obstructor 40 has at least one aperture 42 adapted to be brought into alignment with the optical path between retroreflector 32 and fiber end 28. In the embodiment shown, obstructor 40 is moved from a first position (shown in solid lines) with the optical path between fiber end and retroreflector obstructed by first end 46, through a second position (shown in broken lines) with aperture 42 aligned with that optical path, to a third position with second obstructor end 44 blocking that optical path. Thus, a pulse of light is reflected through fiber 24 back to detector 36 to be used in a conventional manner to change the state of device 10, typically changing between "on" and "off" states. A plurality of switches 18 could be used to change the state of the device, typically one switch at each entrance to a room so that a ceiling light could easily be turned on upon entering the room and off upon leaving, using any entrance and exit.

Obstructor 40 can be actuated in any suitable manner, such as by a "snap" type two position lever switch actuator 19 as seen in FIG. 1. Actuator action is preferably quick and uniform, so that the pulses sent through the optical fiber are of substantially uniform duration and correspond to the arc length of the aperture. While the rotatable arc segment shown in FIG. 3 is preferred for simplicity, accuracy and convenience, any other obstructor shape could be used, if desired. For example, a rotatable disk could be used, rotated 360° upon each actuation, a bendable sheet or a sliding rectangular panel, slidable past the optical path, might be used. Either an aperture in such a panel of the edge of the panel could perform the obstruct/not-obstruct function.

With the arrangement shown in FIG. 2, only a single electrical device at the location of device 10 in FIG. 1 could be operated through a single optical fiber from a switch location. In some cases, it is desirable to change two states at the device location. For example, a ceiling fan may incorporate a ceiling light. Actuation of either or both from a remote location may be desired. Or, it may be desired to both turn a light on and off and change light intensity between high and low from a remote location. The arrangement illustrated in FIG. 3 permits the actuation of a plurality of devices through a single fiber optic bundle.

The end 28 of optical fiber or fiber bundle 24 is divided (such as by a fiber optic coupler), one half aligned with retroreflector 32 and controlled by an obstructor 40 having a single aperture 42 of the sort shown in FIG. 2, controlled by a first switch actuator (not shown) of the sort shown at 19 in FIG. 1. The second half of end 28 is aligned with a second retroreflector 50 and is controlled by second obstructor 52 having a narrow aperture 54 and an elongated aperture 56. When obstructor 52 is rotated about pivot 58, short and long pulses of light are passed back through optical fiber 24. Of course, any suitable combination of pulse lengths could be used. Obstructor 52 is moved between the two obstructing end positions by a conventional switch actuator (not shown) of the sort shown at 19 in FIG. 1.

Typically, conventional operating means at the device 10 receives either a single short pulse from retroreflector 32 via obstructor aperture 42 or a pair of short and long pulses from retroreflector 50 via obstructor apertures 54 and 56 and changes the state of one of the two devices being controlled. Otherwise encoded pulses may be used, as desired. Additional devices or different variables in a single device may be controlled from any one of a plurality of remote locations with only a single optical fiber or bundle running from each group of switches at each location to the device controller, simply by providing a plurality of obstructors producing different light pulse patterns.

Any suitable emitter and detector may be used. Typical emitters include those available from the Siemens company under the designations SFH 450, SFH 750 and others and Motorola under the LED 76 designation and others. Typical detectors include phototransistors such as the SFH 350 and PIN photodiodes such as the SFH250 from Siemens and various photo-Darlington hybrids from Motorola. Appropriate circuits for operating the emitters and detectors and controlling devices, such as lamps, in response to the detectors are available from a variety of sources, such as the Motorola MOS/NMOS Special Functions Data Book, published in 1988.

FIG. 4a shows an alternate embodiment in which a transparent obstructor 40, mounted on an arm 43 and pivotable about a pivot 41 as in FIG. 2, carries one (or more) opaque regions 58. In this embodiment, light will normally be reflected back into the fiber from the retroreflector. When obstructor 40 is pivoted, light return will be momentarily stopped by opaque region 58, causing a "dark" pulse that can be detected and cause a function to be accomplished in the same manner as the light pulses described above. Conveniently, disks 58 can be adhesively bonded to a glass, plastic or other transparent material forming obstructor 40.

Figure 4B:
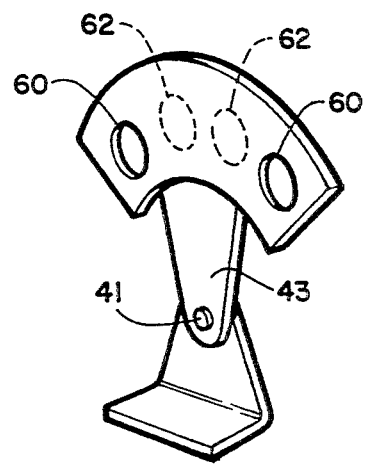
FIG. 4b is a schematic elevation view of a light obstructor having a pulse code modulation pattern.
Figure 4C:
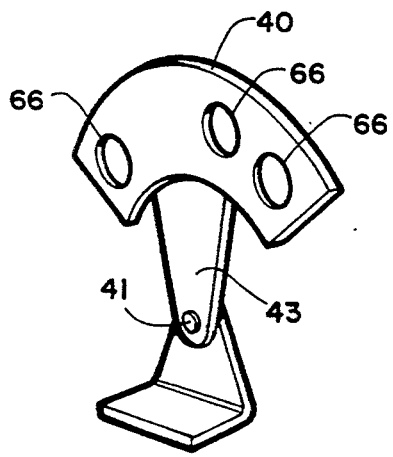
FIG. 4c is a schematic elevation view of a light obstructor having a pulse position modulation pattern.
Figure 4D:
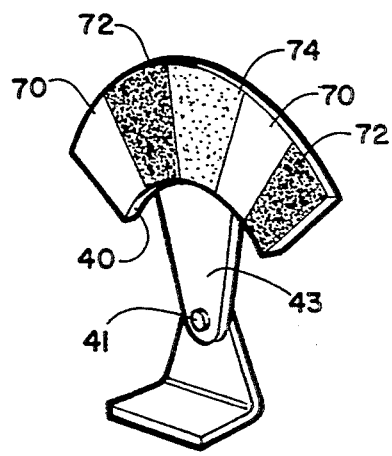
FIG. 4d is a schematic elevation view of a light obstructor having areas of different density.

FIG. 4d shows an obstructor having regions of different optical density, to produce pulses of varying light intensity. Here, obstructor 40 comprises pie-shaped panels of different light transmission characteristics. For example, panels 70 could be transparent (or, conversely, opaque). Panels 72 have high optical density, typically transmitting about 30% of the incident light, and panel 74 has lower density, transmitting about 60% of the incident light. Using conventional decoding systems having light detectors sensitive to the intensity of the light reaching them, a variety of different functions can be accomplished. As a further embodiment, panels 70-74 could consist of filters of different colors, so that a detector sensitive to colors could detect and respond to a pattern of pulses of selected colors.

FIG. 4b shows an alternate obstructor 40 mounted on an arm 43 for rotation about a pivot 41. In this embodiment, the light signal is pulse code modulated, with several (here, four) equally spaced areas that can selectively be made pulse generating areas. As shown, obstructor 40 is opaque and has two aperture areas 60 and two closed areas 62. This provides a 1-0-0-1 coding. The coding may be made fully variable with all of the areas open and "pop-out" disks inserted in selected areas to close off those areas. Also, if desired, the obstructor 40 could be transparent and opaque disks could be secured at areas 60 to produce the same pattern of "dark" pulses.

FIG. 4c shows an alternate embodiment providing pulse position modulation, with obstructor 40 pivotable on arm 43 about pivot 41. Two or more pulse generating areas 66 are provided, spaced selected distances apart. With two areas 66, the specific selected time interval (corresponding to area spacing) between the receipt of two pulses will be decoded in a conventional manner to cause a specific response. More complex coding can be provided with more than two areas 66 with different spacings. If desired, obstructor 40 could be transparent and opaque disks could be secured to the obstructor to form pulse generating areas generating "dark" pulses.

Other applications, variations and ramifications of this invention will occur to those skilled in the art upon reading this disclosure. Those are intended to be included within the scope of this invention, as defined in the appended claims.

We claim:

1. A fiber optic switch system for controlling a remote electrical device, said switch system comprising:
    a single optical fiber means having a first end at a first location and extending to a second end at a second location remote from said first location;
    at least one electrical device at said second location adapted to being switched among at least two different states;
    an emitter at said second location adapted to introduce light into said optical fiber;
    a detector at said second location adapted to receive light from said optical fiber;
    a retroreflector adjacent to said first end of said fiber at said remote location to reflect a major portion of light exiting said fiber back into said fiber;
    light transmission obstructor means movable between said retroreflector and said first end of said fiber having discrete pulse generating areas selectively changing passage of at least a portion of light between said retroreflector and said fiber;
    means for moving said obstructor means past the end of said fiber whereby at least one pulse of different light intensity is allowed to pass from the end of said fiber, to said retroreflector and back into said fiber; and
    means for changing the operating state of said at least one electrical device in response to the receipt of pulses of different light intensity at said detector.

2. The switch system according to claim 1 wherein said obstructor means is a pivotally mounted circle segment panel having uniform light transmission characteristics and having a discrete pulse generating area of different light transmission characteristics and the means for moving said obstructor includes a lever actuator for pivoting the segment.

3. The switch system according to claim 1 wherein said obstructor means has plural pulse generating areas having different lengths providing pulses of corresponding different durations for signal pulse width modulation.

4. The switch system according to claim 1 wherein said obstructor means has at least three pulse generating areas having different spacings between adjacent pulse generating areas providing a selected pattern of pulses for signal pulse position modulation.

5. The switch system according to claim 1 wherein said obstructor means has a sequence of uniformly spaced and shaped areas, with selected ones of said areas being pulse generating areas forming a selected pattern, whereby as said sequence is moved between said fiber and said retroreflector, a pattern of pulses is generated corresponding to the area pattern for pulse code modulation.

6. The switch system according to claim 1 wherein said obstructor means is opaque and said pulse generating areas are light transmitting.

7. The switch system according to claim 1 wherein said obstructor means is substantially light transmitting and said pulse generating areas are opaque.

8. The switch system according to claim 1 wherein said obstructor means is opaque and said light transmitting areas vary in light transmission characteristics.

9. The switch system according to claim 1 wherein the optical fiber means is divided into plural fibers at the first end and an obstructor means is provided at each divided end, the pulse generating areas in each obstructor means varying to reflect pulses having different characteristics back into said fiber.

10. The switch system according to claim 1 further including a plurality of optical fibers extending from said emitter and detector to a plurality of said switches, each comprising one of said retroreflectors and associated obstructor means, whereby any of said switches can change the state of said electrical device.

11. The switch system according to claim 1 wherein said retroreflector is a sheet bearing a plurality of small retroreflecting areas, said areas comprising retroreflectors selected from the group consisting of cube-corner retroreflectors and spherical lens retroreflectors.

12. The switch system according to claim 1 wherein said optical fiber means is axially bonded to a wall surface between said switch and device being controlled.

13. The switch system according to claim 1 wherein said optical fiber means is axially bonded to a length of tape adapted to be bonded to a wall surface between said switch and device being controlled.

14. The switch system according to claim 1 wherein said electrical device is a mechanical manual switch connected to an additional electrical device spaced from said mechanical switch, and includes means permitting either said fiber optic switch or said mechanical switch to control said additional electrical device.

15. The switch system according to claim 1 wherein said emitter is a light emitting diode.

16. The switch system according to claim 1 wherein said single optical fiber means includes a plurality of substantially parallel fibers, which carry the emitter signal to said switch and which carry the return signal to said detector.

17. The switch system according to claim 1 wherein said optical fiber means comprises a bundle of individual fibers, said bundle being divided at said first location, with a first portion of said bundle aligned with said emitter and the remaining portion of said bundle aligned with said detector.

18. The switch system according to claim 1 wherein said emitter and detector are substantially abutting along a line, with the end of said optical fiber means aligned with said line, so that about half of the optical fiber means is operatively engaged with each of said emitter and detector.

19. The switch system according to claim 1 wherein said emitter and detector are stacked adjacent to each other with a fiber optic coupler dividing said optical fiber at said end to provide two full diameter ends adjacent to said emitter and detector.

20. The switch system according to claim 1 wherein said optical fiber has a diameter of from about 0.003 to 0.10 inch.

21. In a fiber optic switch system for controlling a remote electrical device, said switch system comprising a single optical fiber means extending between at least one electrical device to at least one remote location an emitter at an electrical device location to introduced light into a first end of said optical fiber means, a detector at the electrical device location to receive light from said optical fiber means, and optical switch assembly at the second end of the fiber optic means, at the remote location, including a retroreflector positioned to reflect light exiting said second end back into the second end and means for permitting at least one pulse of different light intensity to be so reflected upon actuation of the switch, and means for changing an operating state of said electrical device in response to the receipt of at least on light pulse at said detector, the improvement wherein:

said means for permitting at least one pulse of different light intensity to be reflected comprises:
obstructor means movable between said retroreflector and said first end of said fiber, said obstructor having substantially uniform light transmission characteristics;
at least one discrete pulse generating area having different light transmission characteristics in said obstructor means adapted to being brought into alignment with the optical path between said second fiber end and said retroreflector;
means for moving said obstructor means past the end of said fiber whereby at least one pulse of different light transmission characteristics is allowed to pass from the end of said fiber, to said retroreflector and back into said fiber.

22. The improvement according to claim 21 wherein said obstructor means is a pivotally mounted circle segment panel having at least one discrete pulse generating area having light transmission characteristics different from those of said panel and the means for moving said obstructor includes a lever actuator for pivoting the segment.

23. The improvement according to claim 21 wherein said obstructor means has plural pulse generating areas having different lengths providing light pulses of corresponding different durations.

24. The improvement according to claim 21 wherein said obstructor means has at least three pulse generating areas having different spacings providing a selected pattern of pulses.

25. The improvement according to claim 21 wherein said obstructor means has a sequence of uniformly spaced and shaped areas, with selected ones of said areas being pulse generating areas forming a selected pattern, whereby as said sequence is moved between said fiber and said retroreflector at a uniform rate, a pattern of pulses is generated corresponding to the area pattern.

26. The improvement according to claim 21 wherein said obstructor means is opaque and said pulse generating areas are light transmitting.

27. The improvement according to claim 21 wherein said obstructor means is substantially light transmitting and said pulse generating areas are opaque.

28. The improvement according to claim 21 wherein said obstructor means is opaque and said light transmitting areas vary in light transmission characteristics.

29. The improvement according to claim 21 wherein the optical fiber means is divided into plural fibers at the first end and an obstructor means is provided at each divided end, the apertures in each obstructor means varying to reflect pulses having different characteristics back into said fiber.

30. The improvement according to claim 21 further including a plurality of optical fibers extending from said detector to a plurality of said switches, each comprising one of said retroreflectors and associated obstructor means, whereby any of said switches can change the state of said electrical device.

31. The improvement according to claim 21 wherein said retroreflector is a sheet bearing a plurality of small retroreflecting areas, said areas comprising retroreflectors selected from the group consisting of cube-corner retroreflectors and spherical lens retroreflectors.

32. The improvement according to claim 21 wherein said optical fiber means is bonded to a wall surface between said switch and device being controlled.

33. The improvement according to claim 21 wherein said optical fiber means is axially bonded to a length of tape adapted to be bonded to a wall surface between said switch and device being controlled.

34. The improvement according to claim 21 wherein said electrical device is a mechanical manual switch connected to an additional electrical device spaced from said mechanical switch, and includes means permitting either said fiber optic switch or said mechanical switch to control said additional electrical device.

35. The improvement according to claim 21 wherein said emitter is a light emitting diode.

36. The improvement according to claim 21 wherein said single optical fiber means includes a plurality of substantially parallel fibers, which carry the emitter signal to said switch and which carry the return signal to said detector.

37. The improvement according to claim 21 wherein said optical fiber means comprises a bundle of individual fibers, said bundle being divided at said first location, with a first portion of said bundle aligned with said emitter and the remaining portion of said bundle aligned with said detector.

38. The switch system according to claim 21 wherein said emitter and detector are stacked adjacent to each other with a fiber optic coupler dividing said optical fiber at said end to provide two full diameter ends adjacent to said emitter and detector.

39. The improvement according to claim 21 wherein said emitter and detector are substantially abutting along a line, with the end of said optical fiber means aligned with said line, so that about half of the optical fiber means is operatively engaged with each of said emitter and detector.

40. The improvement according to claim 21 wherein said optical fiber has a diameter of from about 0.003 to 0.10 inch.

* * * * *